(12) United States Patent
Cohen et al.

(10) Patent No.: US 11,586,845 B2
(45) Date of Patent: Feb. 21, 2023

(54) METHOD FOR AUTOMATICALLY IDENTIFYING SIGNALS OR PATTERNS IN TIME SERIES DATA BY TREATING SERIES AS IMAGE

(71) Applicant: JPMorgan Chase Bank, N.A., New York, NY (US)

(72) Inventors: Naftali Y. Cohen, New York, NY (US); Keshav Ramani, Jersey City, NJ (US); Tucker Richard Balch, Suwanee, GA (US); Maria Manuela Veloso, Pittsburgh, PA (US); Srijan Sood, New York, NY (US); Zhen Zeng, Ypsilanti, MI (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 302 days.

(21) Appl. No.: 16/887,364

(22) Filed: May 29, 2020

(65) Prior Publication Data
US 2020/0320343 A1 Oct. 8, 2020

Related U.S. Application Data

(63) Continuation-in-part of application No. PCT/US2019/055668, filed on Oct. 10, 2019.
(Continued)

(51) Int. Cl.
| | |
|---|---|
| *G06K 9/62* | (2022.01) |
| *G06Q 40/06* | (2012.01) |
| *G06K 9/00* | (2022.01) |
| *G06N 5/02* | (2023.01) |
| *G06N 20/00* | (2019.01) |
| *G06Q 30/0201* | (2023.01) |

(Continued)

(52) U.S. Cl.
CPC ....... *G06K 9/6256* (2013.01); *G06K 9/00496* (2013.01); *G06K 9/6255* (2013.01);
(Continued)

(58) Field of Classification Search
CPC ............ G06K 9/6256; G06K 9/00496; G06K 9/6255; G06N 5/02; G06N 20/00; G06Q 40/06
(Continued)

(56) References Cited

U.S. PATENT DOCUMENTS

2004/0220771 A1  11/2004  Breiman
2009/0204548 A1  8/2009  Swearingen et al.
(Continued)

OTHER PUBLICATIONS

International Search Report and Written Opinion of the International Searching Authority in corresponding International Application No. PCT/US19/55668 dated Jan. 2, 2020.
(Continued)

*Primary Examiner* — Stephen P Coleman
(74) *Attorney, Agent, or Firm* — Greenblum & Bernstein, P.L.C.

(57) ABSTRACT

A method for using images that represent time-series data to forecast future images depicting future values as pixelated information is provided. The method includes: receiving a first set of time-series data; converting the received first set of time-series data into a first image; and using the first image to forecast a future image depicting future values as pixelated information that corresponds to a future time interval Training sets of time-series data are used to generate historical data that provides input to a machine learning algorithm, which provides, as an output, a composite image that depicts the future values as pixelated information that reflects associated uncertainties in the value predictions.

18 Claims, 9 Drawing Sheets

Related U.S. Application Data

(60) Provisional application No. 62/830,937, filed on Apr. 8, 2019.

(51) Int. Cl.
  *G06Q 30/0202* (2023.01)
  *G06Q 40/04* (2012.01)

(52) U.S. Cl.
  CPC ............ *G06K 9/6296* (2013.01); *G06N 5/02* (2013.01); *G06N 20/00* (2019.01); *G06Q 30/0201* (2013.01); *G06Q 30/0202* (2013.01); *G06Q 40/04* (2013.01); *G06Q 40/06* (2013.01)

(58) Field of Classification Search
  USPC .......................................................... 706/25
  See application file for complete search history.

(56) References Cited

U.S. PATENT DOCUMENTS

| | | | |
|---|---|---|---|
| 2014/0198979 A1* | 7/2014 | Hamarneh | G06T 7/11 |
| | | | 382/154 |
| 2015/0154700 A1* | 6/2015 | Hackett | G06Q 40/04 |
| | | | 705/37 |
| 2017/0185664 A1 | 6/2017 | Chu et al. | |
| 2018/0349790 A1* | 12/2018 | Cai | G06N 20/00 |

OTHER PUBLICATIONS

International Preliminary Report on Patentability in corresponding International Application No. PCT/US2019/055668 dated Sep. 28, 2021.

* cited by examiner

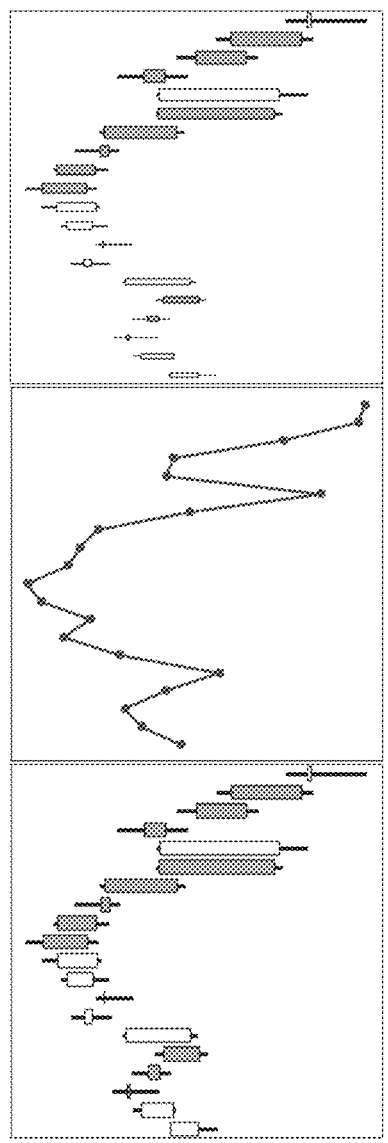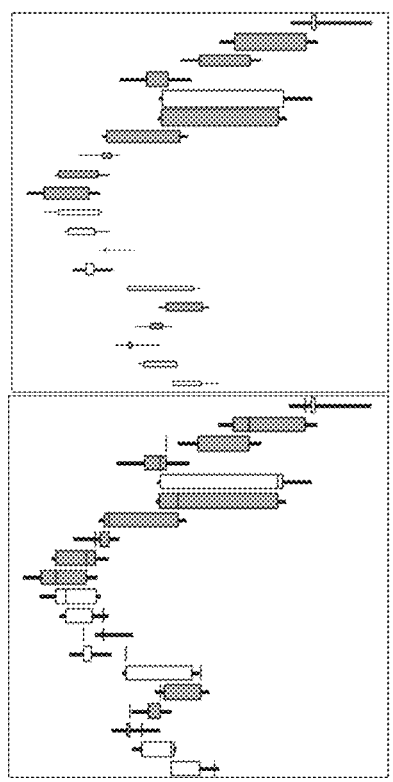

METHOD FOR AUTOMATICALLY IDENTIFYING SIGNALS OR PATTERNS IN TIME SERIES DATA BY TREATING SERIES AS IMAGE

CROSS-REFERENCE TO RELATED APPLICATIONS

This application is a continuation-in-part of International Application No. PCT/US2019/055668, filed Oct. 10, 2019, which claims the benefit of U.S. Provisional Patent Application Ser. No. 62/830,937, filed Apr. 8, 2019, each of which is hereby incorporated by reference in its respective entirety.

BACKGROUND

1. Field of the Disclosure

This technology generally relates to methods and systems for processing time series data signals, and more particularly, to methods and systems for identifying signals or patterns in time series data by treating the series as an image, and using such images to forecast future values.

2. Background Information

Traders execute buy and sell orders of securities while observing charts of time-series data, such as data that indicates a history of a price of a particular stock. Various algorithms have been developed for the purpose of analyzing such time-series data in order to improve a trader's ability to make a determination as to whether to buy or not buy a particular stock, and to improve a trader's ability to forecast future values of the time-series data. Conventional algorithms process the time-series data as a list of numerical data.

When a human trader views the time-series data, it is generally displayed in graphical form, and may appear as a jagged line that has an overall trend in an upward or downward direction, similar to a noisy signal. In this aspect, when the human trader uses such a display to determine whether or not to buy a stock and/or a future trajectory of values, the data may be processed as an image, instead of as a series of numbers.

Accordingly, there is a need for a method for automatically processing time-series data as an image, in order to accurately and efficiently capture the decisions that would likely be made by a human trader when viewing such data.

SUMMARY

The present disclosure, through one or more of its various aspects, embodiments, and/or specific features or sub-components, provides, inter alia, various systems, servers, devices, methods, media, programs, and platforms for automatically processing time-series data as an image, and using such images to forecast future values, again, as an image.

According to an aspect of the present disclosure, a method for analyzing time-series data is provided. The method includes: identifying, from within a first set of time-series data, at least a first data sequence that corresponds to a first pattern, and at least a second data sequence that corresponds to a second pattern, each of the first data sequence and the second data sequence being representative of a predetermined time interval; converting the first data sequence into a first image and converting the second data sequence into a second image; receiving a second set of time-series data; converting the second set of time-series data into a third image; comparing each of the first image and the second image with a portion of the third image that corresponds to a most recent time interval; and determining whether the portion of the third image that corresponds to the most recent time interval corresponds to any of the first pattern and the second pattern based on a result of the comparison.

The method may further include augmenting each of the first image and the second image with at least one box-and-whisker notation that indicates an opening value, a highest value, a lowest value, a closing value, and an indication regarding whether the opening value is greater than or less than the closing value for each respective image.

The determining may include using the augmented first image and the augmented second image to determine whether the corresponding at least one of the first pattern and the second pattern corresponds to an indication for at least one of a buying opportunity and a selling opportunity. When the buying opportunity is indicated, the method may further include transmitting a message that includes a buy recommendation to a predetermined destination. When the selling opportunity is indicated, the method may further include transmitting message that includes a sell recommendation to the predetermined destination.

The determining may further include using an algorithm that implements a Bollinger Bands (BB) crossing technique for determining whether at least one of a buying opportunity and a selling opportunity is indicated.

The determining may further include using an algorithm that implements a Moving Average Convergence Divergence (MACD) crossing technique for determining whether at least one of a buying opportunity and a selling opportunity is indicated.

The determining may further include using an algorithm that implements a Relative Strength Index (RSI) crossing technique for determining whether at least one of a buying opportunity and a selling opportunity is indicated.

The converting the second set of time-series data into the third image may include implementing a 30-day window with respect to the third image.

The augmenting may further include linearly varying a respective width of each of the at least one box-and-whisker notation.

The augmenting may further include varying a respective width of each of the at least one box-and-whisker notation based on a corresponding change in trade volume.

The augmenting may further include overlaying a previous respective closing value on each of the at least one box-and-whisker notation.

The determining may include using the augmented first image and the augmented second image to determine whether the corresponding at least one of the first pattern and the second pattern corresponds to at least one of an indication for a volatile market and a calm market. When the volatile market is indicated, the method may further include transmitting a message that includes information that relates to market volatility to a predetermined destination. When the calm market is indicated, the method may further include transmitting a message that includes information that relates to market calmness to the predetermined destination.

The determining may further include using the augmented first image and the augmented second image to determine whether the corresponding at least one of the first pattern and the second pattern corresponds to at least one of an indication for an economic growth and a recession. When the economic growth is indicated, the method may further include transmitting a message that includes information that relates to economic growth to a predetermined destination. When the recession is indicated, the method may further include transmitting a message that includes information that relates to the recession to the predetermined destination.

According to another aspect of the present disclosure, a computing apparatus for analyzing time-series data is provided. The computing apparatus includes a processor, a memory, and a communication interface coupled to each of the processor, the memory, and a display screen. The processor is configured to: identify, from within a first set of time-series data, at least a first data sequence that corresponds to a first pattern, and at least a second data sequence that corresponds to a second pattern, each of the first data sequence and the second data sequence being representative of a predetermined time interval; convert the first data sequence into a first image and convert the second data sequence into a second image; receive, via the communication interface, a second set of time-series data; convert the second set of time-series data into a third image; compare each of the first image and the second image with a portion of the third image that corresponds to a most recent time interval; and determine whether the portion of the third image that corresponds to the most recent time interval corresponds to at least one of the first pattern and the second pattern based on a result of the comparison.

The processor may be further configured to augment each of the first image and the second image with at least one box-and-whisker notation that indicates an opening value, a highest value, a lowest value, a closing value, and an indication regarding whether the opening value is greater than or less than the closing value for each respective image.

The processor may be further configured to use the augmented first image and the augmented second image to determine whether the corresponding at least one of the first pattern and the second pattern corresponds to an indication for at least one of a buying opportunity and a selling opportunity, and when the buying opportunity is indicated, to transmit a message that includes a buy recommendation to a predetermined destination, and when the selling opportunity is indicated, to transmit a message that includes a sell recommendation to the predetermined destination.

The processor may be further configured to use an algorithm that implements a Bollinger Bands (BB) crossing technique for determining whether at least one of a buying opportunity and a selling opportunity is indicated.

The processor may be further configured to use an algorithm that implements a Moving Average Convergence Divergence (MACD) crossing technique for determining whether at least one of a buying opportunity and a selling opportunity is indicated.

The processor may be further configured to use an algorithm that implements a Relative Strength Index (RSI) crossing technique for determining whether at least one of a buying opportunity and a selling opportunity is indicated.

The processor may be further configured to implement a 30-day window with respect to the third image.

The processor may be further configured to linearly vary a respective width of each of the at least one box-and-whisker notation.

The processor may be further configured to vary a respective width of each of the at least one box-and-whisker notation based on a corresponding change in trade volume.

The processor may be further configured to overlay a previous respect closing value on each of the at least one box-and-whisker notation.

The processor may be further configured to use the augmented first image and the augmented second image to determine whether the corresponding at least one of the first pattern and the second pattern corresponds to at least one of an indication for a volatile market and a calm market, and when the volatile market is indicated, to transmit a message that includes information that relates to market volatility to a predetermined. destination, and when the calm market is indicated, to transmit a message that includes information that relates to market calmness to the predetermined destination.

The processor may be further configured to use the augmented first image and the augmented second image to determine whether the corresponding at least one of the first pattern and the second pattern corresponds to at least one of an indication for an economic growth and a recession, and when the economic growth is indicated, to transmit a message that includes information that relates to economic growth to a predetermined destination, and when the recession is indicated, to transmit a message that includes information that relates to the recession to the predetermined destination.

According to yet another aspect of the present disclosure, a method for using images that represent time-series data to forecast corresponding images depicting future values as pixelated information is provided. The method is implemented by at least one processor. The method includes: receiving a first set of time-series data; converting the received first set of time-series data into a first image; and using the first image to forecast at least one image depicting at least one future value as pixelated information.

The method may further include: receiving a plurality of training sets of time-series data; converting each respective one of the plurality of training sets of time-series data into a corresponding one of a plurality of training images; and using the plurality of training images in conjunction with the first image to forecast the at least one image depicting the at least one fixture value as pixelated information.

The method may further include: using the plurality of training images to generate a historical database; using the historical database as an input to a machine learning algorithm; and using the machine learning algorithm in conjunction with the first image to forecast the at least one image depicting the at least one future value as pixelated information.

The machine learning algorithm may include an algorithm that relates to any one or more of Multinomial Regression models, Multioutput Classification models, Neural Network, Convolutional Neural Network, Autoencoders, Convolutional Autoencoders, Variational Autoencoders, and/or Generative Adversarial Networks.

The at least one image depicting the at least one future value as pixelated information may include a plurality of future images depicting a plurality of future values that corresponds to a predetermined future time interval.

The method may further include determining, for each respective one of the plurality of future images, a respective probability that indicates a corresponding uncertainty with respect to an accuracy of the respective one of the plurality of future images.

The using of the first image to forecast the at least one image depicting the at least one future value as pixelated information may include representing the corresponding uncertainty by using at least one from among a depth, a color, and a density of the pixelated information.

The method may further include: determining, for each training set of the plurality of training sets of time-series data, a first subset that begins at a first beginning time and ends at a first ending time, and a second subset that begins at a second beginning time and ends at a second ending time, such that the second beginning time occurs before or after the first ending time and the second ending time occurs after the second ending time; for each training set, using the first image subset as an input to the machine learning algorithm; for each training set, using the machine learning algorithm to predict images that correspond to the second image subset; comparing the predicted images with the second subset; and adjusting the machine learning algorithm based on a result of the comparing.

The determining of each respective probability that indicates the corresponding uncertainty may be performed based on a result of the comparing the predicted values with the second subset.

The method may further include using the adjusted machine learning algorithm to re-forecast each of the plurality of future images depicting the plurality of future values that corresponds to the predetermined future time interval.

According to still another exemplary embodiment, a computing apparatus for using images that represent time-series data to forecast corresponding images depicting future values as pixelated information is provided. The computing apparatus includes a processor; a memory; and a communication interface coupled to each of the processor and the memory. The processor is configured to: receive a first set of time-series data; convert the received first set of time-series data into first image; and use the first image to forecast at least one image depicting at least one future value as pixelated information.

The processor may be further configured to: receive a plurality of training sets of time-series data; convert each respective one of the plurality of training sets of time-series data into a corresponding one of a plurality of training images; and use the plurality of training images in conjunction with the first image to forecast the at least one image depicting the at least one future value as pixelated information.

The processor may be further configured to: use the plurality of training images to generate a historical database; use the historical database as an input to a machine learning algorithm; and use the machine learning algorithm in conjunction with the first image to forecast the at least one image depicting the at least one future value as pixelated information.

The at least one image depicting the at least one future value may include a plurality of future images depicting a plurality of future values that corresponds to a predetermined future time interval.

The processor may be further configured to determine, for each respective one of the plurality of future images, a respective probability that indicates a corresponding uncertainty with respect to an accuracy of the respective one of the plurality of future images.

For each respective one of the plurality of future images, the processor may be further configured to represent the corresponding uncertainty by using at least one from among a depth, a color, and a density of the pixelated information.

The processor may be further configured to: determine, for each training set of the plurality of training sets of time-series data, a first subset that begins at a first beginning time and ends at a first ending time, and a second subset that begins at a second beginning time and ends at a second ending time, such that the second beginning time occurs before or after the first ending time and the second ending time occurs after the second ending time; for each training set, use the first subset as an input to the machine learning algorithm; for each training set, use the machine learning algorithm to predict values that correspond to the second subset; compare the predicted values with the second subset; and adjust the machine algorithm based on a result of the comparison.

The processor may be further configured to determine each respective probability that indicates the corresponding uncertainty based on a result of the comparison of the predicted values with the second subset.

The processor may be further configured to use the adjusted machine learning algorithm to re-forecast each of the plurality of future images depicting the plurality of future values that corresponds to the predetermined future time interval,

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIGS. 6A, 6B, 6C, 6D, and 6E are visual representations of time-series data with box-and-whisker notations, according to an exemplary embodiment.

DETAILED DESCRIPTION

Through one or more of its various aspects, embodiments and/or specific features or sub-components of the present disclosure, are intended to bring out one or more of the advantages as specifically described above and noted below The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
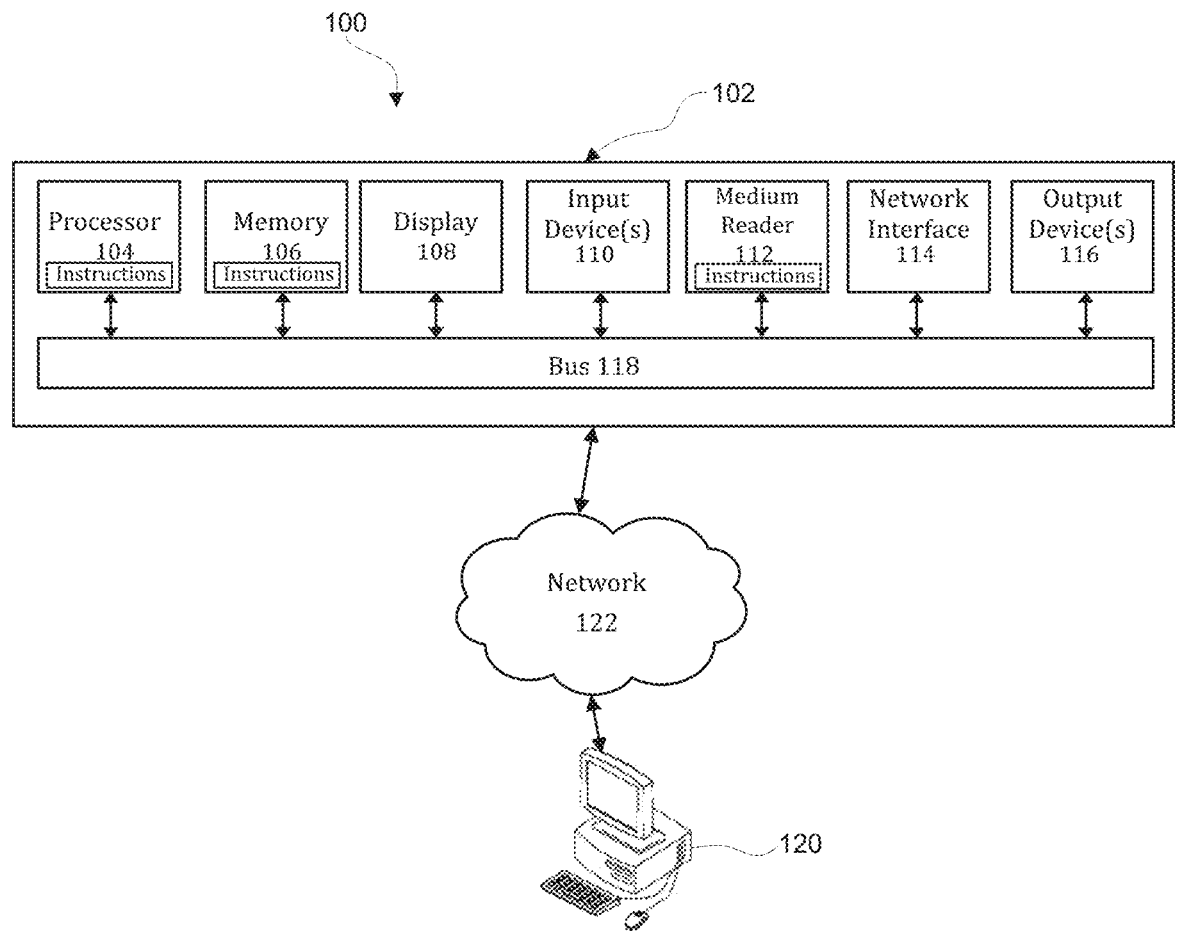
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein, Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof, Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG, 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for identifying signals or patterns in time series data by treating the series as an image, and using such images to forecast future image containing future values.

Figure 2:
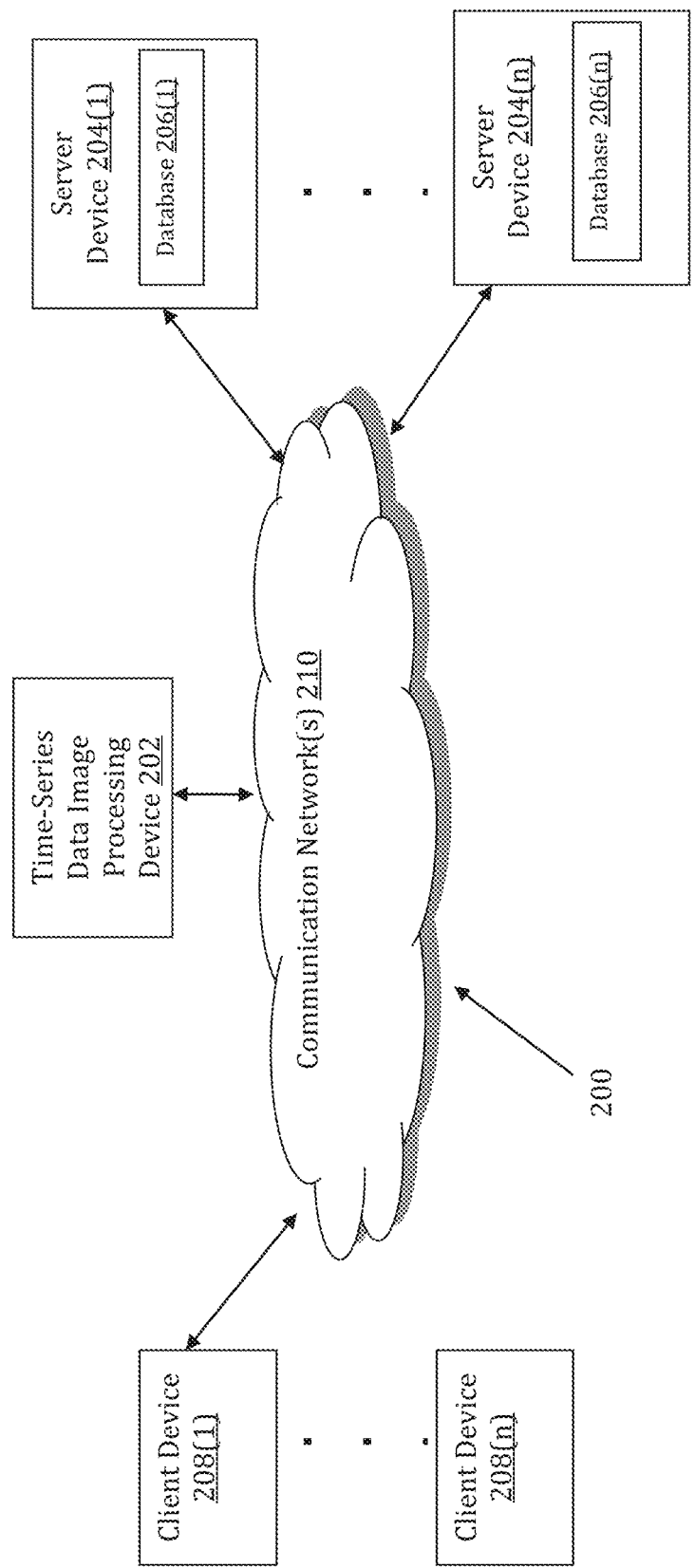
FIG. 2 illustrates an exemplary diagram of a network environment.

Referring to FIG. 2, a schematic of an exemplary network environment 200 for implementing a method for identifying signals or patterns in time series data by treating the series as an image and using such images to forecast future image containing future values is illustrated. In an exemplary embodiment, the method is executable on any networked computer platform, such as, for example, a personal computer (PC).

The method for identifying signals or patterns in time series data by treating the series as an image and using such images to forecast future image containing future values may be implemented by a Time-Series Data Image Processing (TSDIP) device 202. The TSDIP device 202 may be the same or similar to the computer system 102 as described with respect to FIG. 1. The TSDIP device 202 may store one or more applications that can include executable instructions that, when executed by the TSDIP device 202, cause the TSDIP device 202 to perform actions, such as to transmit, receive, or otherwise process network messages, for example, and to perform other actions described and illustrated below with reference to the figures, The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TSDIP device 202 itself, may be located in virtual server(s) running in a cloud-based computing environment rather than being tied to one or more specific physical network computing devices. Also, the application(s) may be running in one or more virtual machines (VMs) executing on the TSDIP device 202. Additionally, in one or more embodiments of this technology, virtual machine(s) running on the TSDIP device 202 may be managed or supervised by a hypervisor.

In the network environment 200 of FIG. 2, the TSDIP device 202 is coupled to a plurality of server devices 204(1)-204(n) that hosts a plurality of databases 206(1)-206(n), and also to a plurality of client devices 208(1)-208(n) via communication network(s) 210. A communication interface of the TSDIP device 202, such as the network interface 114 of the computer system 102 of FIG. 1, operatively couples and communicates between the TSDIP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TSDIP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and TSDIP devices that efficiently implement a method for identifying signals or patterns in time series data by treating the series as an image and using such images to forecast future image containing future values.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TSDIP device 202 may be a standalone device or integrated with one or more other devices or apparatuses, such as one or more of the server devices 204(1)-204(n), for example. In one particular example, the TSDIP device 202 may include or be hosted by one of the server devices 204(1)-204(n), and other arrangements are also possible. Moreover, one or more of the devices of the TSDIP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TSDIP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store historical market data, such as price data for individual securities and/or market indexes, and pattern matching data, which includes data that relates to images of time-series data that is usable for performing pattern matching with market data in order to facilitate decisions regarding whether to buy a security.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the TSDIP device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the TSDIP device 202 via the communication network(s) 210 in order to communicate user requests and information. The client devices 208(i)-208(n) may further include, among other features, a display device, such as a display screen or touchscreen, and/or an input device, such as a keyboard, for example.

Although the exemplary network environment 200 with the TSDIP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TSDIP device 202, the server devices 204(1)-204(n), or the client devices 208(1)-208(n), for example, may be configured to operate as virtual instances on the same physical machine. In other words, one or more of the TSDIP device 202, the server devices 204(1)-204(n), or the client devices 208(1)-208(n) r ray operate on the same physical device rather than as separate devices communicating through communication network(s) 210. Additionally, there may be more or fewer TSDIP devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer systems) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
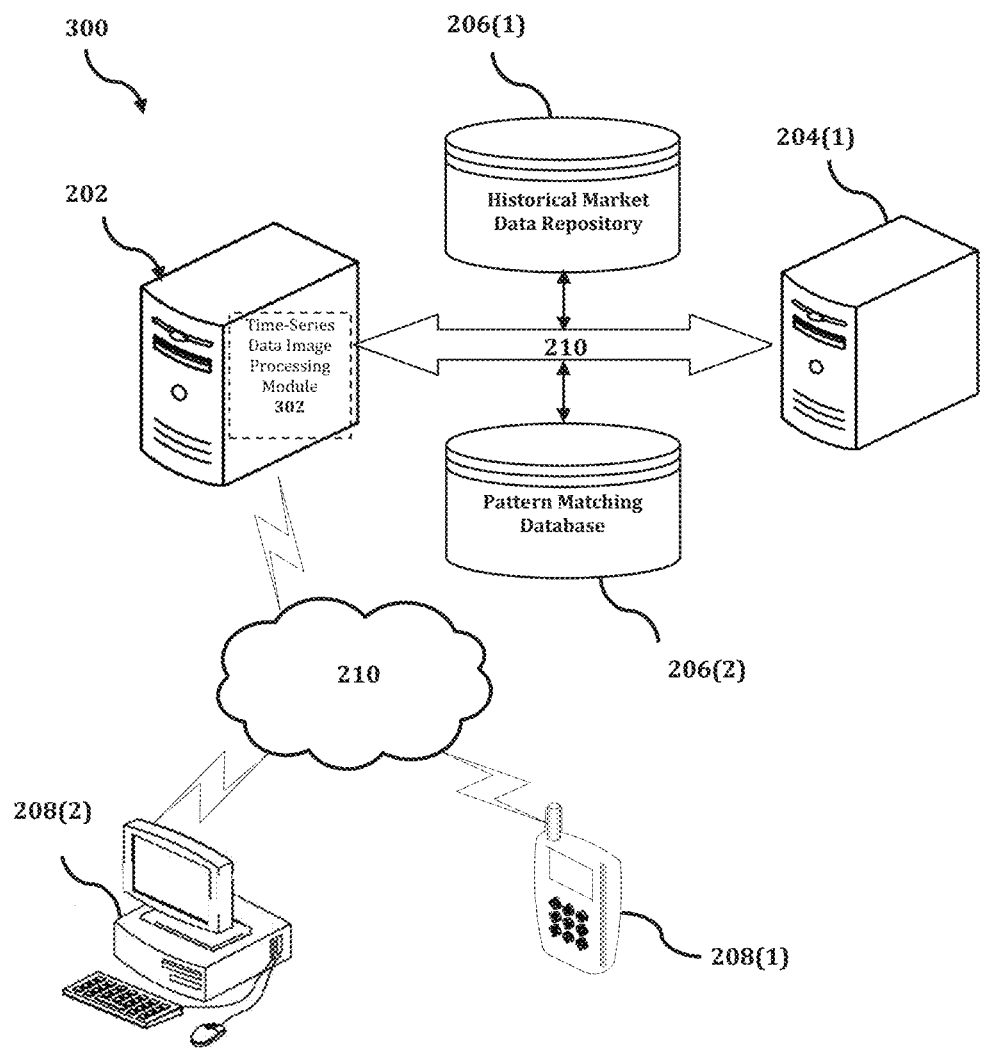
FIG. 3 shows an exemplary system for implementing a method for analyzing time-series data as an image.

The TSDIP device 202 is described and shower in FIG. 3 as including a time-series data image processing module 302, although it may include other rules, policies, modules, databases, or applications, for example. As will be described below, the time-series data image processing module 302 is configured to implement a method for identifying signals or patterns in time series data by treating the series as an image and using such images to forecast future values in an automated, efficient, scalable, and reliable manner.

An exemplary process 300 for implementing a method for identifying signals or patterns in time series data by treating the series as an image and using such images to forecast future values by utilizing the network environment of FIG. 2 is shown as being executed in FIG. 3. Specifically, a first client device 208(1) and a second client device 208(2) are illustrated as being in communication with TSDIP device 202. In this regard, the first client device 208(1) and the second client device 208(2) may be "clients" of the TSDIP device 202 and are described herein as such. Nevertheless, it is to be known and understood that the first client device 208(1) and/or the second client device 208(2) need not necessarily be "clients" of the TSDIP device 202, or any entity described in association therewith herein. Any additional or alternative relationship may exist between either or both of the first client device 208(1) and the second client device 208(2) and the TSDIP device 202, or no relationship may exist.

Further, TSDIP device 202 is illustrated as being able to access a historical market data repository 206(1) and a pattern matching database 206(2). The time-series data image processing module 302 may be configured to access these databases for implementing a method for identifying signals or patterns in time series data by treating the series as an image and using such images to forecast future values.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the TSDIP device 202 via broadband or cellular communication. Of course, these embodiments are merely exemplary and are not limiting or exhaustive.

Upon being started, the time-series data image processing module 302 executes a process for identifying signals or patterns in time series data by treating the series as an image. An exemplary process for identifying signals or patterns in time series data by treating the series as an image is generally indicated at flowchart 400 in FIG. 4.

Figure 4:
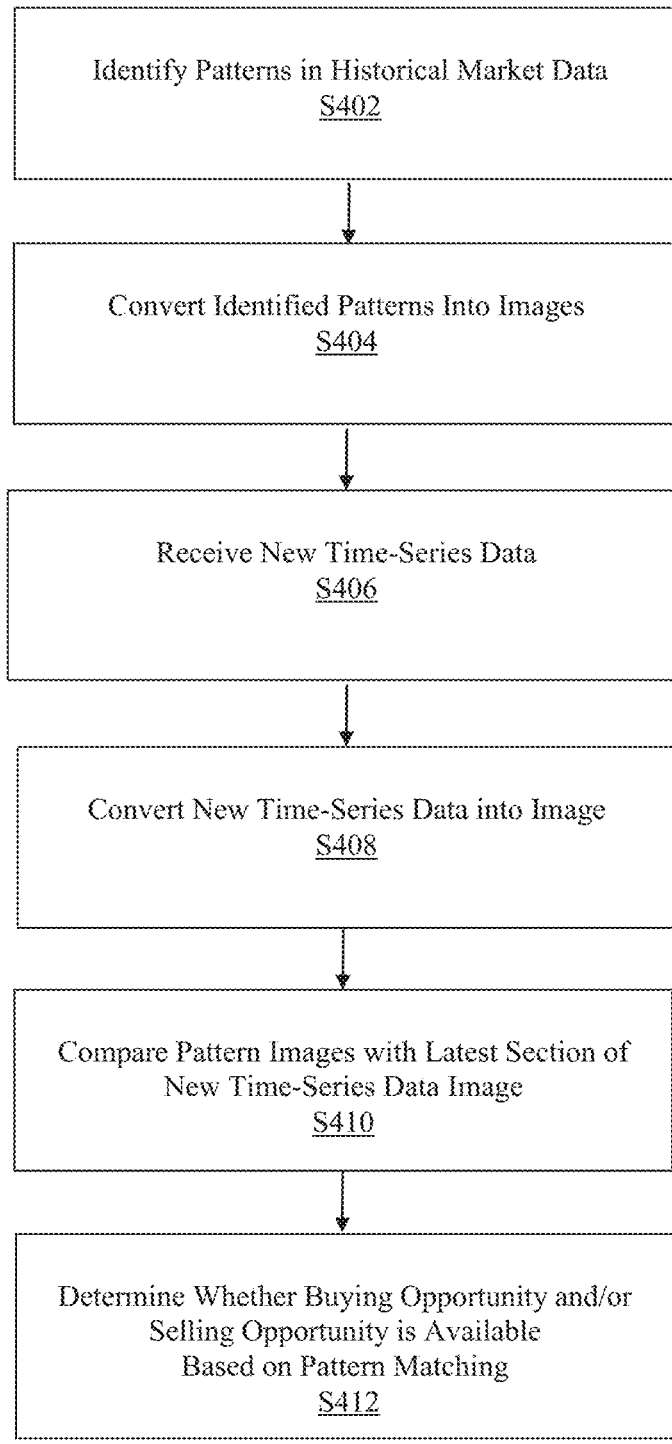
FIG. 4 is a flowchart of an exemplary process for implementing a method for analyzing time-series data as an image.

In the process 400 of FIG. 4, at step S402, the time-series data image processing module 302 identifies patterns of interest that are included in historical market data. For example, referring to FIG. 5, historical market data is illustrated, and three inset boxes are marked for portions of the historical market data in which a pattern of interest has been identified. In an exemplary embodiment, a respective label is attached to each of the identified patterns.

At step S404, the identified patterns are converted into images. In particular, although the historical market data may be originally provided as numerical data or digital data, each subset of data may be converted into an image that resembles a jagged curved line, i.e., a graphical curve that appears to rise and fall as a function of time, and that may resemble a graphical depiction that would typically be viewed by a human analyst. In an exemplary embodiment, each image that corresponds to a pattern is also provided with a respective label.

At step S406, the time-series data image processing module 302 receives new time-series data. Then, at step S408, the newly received data is converted into an image. For example, if a user is interested in analyzing a particular market security for a purpose of determining whether or not to buy the security, a set of recent price data for the security may be received and converted into an image.

At step S410, the pattern images (i.e., the results of step S404) are compared with a section of the newly generated image (i.e., the result of step S408) that corresponds to the most recent time interval. Then, at step S412, the time-series data image processing module 302. determines whether a buying opportunity and/or a selling opportunity is available based on whether there is a match between the image that corresponds to the newly received data and any of the pattern images, For example, if a first pattern image corresponds to a situation that indicates a buying opportunity, and the image that corresponds to the newly received data sufficiently matches the first pattern image, then the time-series data image processing module 302 may determine that a buy recommendation for the market security is indicated. As another example, if a second pattern image corresponds to a situation that indicates a selling opportunity, and the image that corresponds to the newly received data sufficiently matches the second pattern image, then the time-series data image processing module 302 may determine that a sell recommendation for the market security is indicated.

Alternatively, the pattern matching may be performed with respect to other types of market conditions, such as market volatility, market calmness, economic growth, recession, and/or any other suitable types of market conditions. For example, in an alternative exemplary embodiment, at step S412, the time-series data image processing module 302 may determine whether market volatility and/or market calmness is indicated based on whether there is a match between the image that corresponds to the newly received data and any of the pattern images. In this aspect, if a first pattern image corresponds to a situation that indicates market volatility, and the image that corresponds to the newly received data sufficiently matches the first pattern image, then the time-series data image processing module 302 may determine that market volatility is indicated. As another example, if a second pattern image corresponds to a situation that indicates market calmness, and the image that corresponds to the newly received data sufficiently matches the second pattern image, then the time-series data image processing module 302 may determine that market calmness is indicated.

As another example, in another alternative exemplary embodiment, at step S412, the time-series data image processing module 302 may determine whether economic growth and/or a recession is indicated based on whether there is a match between the image that corresponds to the newly received data and any of the pattern images. In this aspect, if a first pattern image corresponds to a situation that indicates economic growth, and the image that corresponds to the newly received data sufficiently matches the first pattern image, then the time-series data image processing module 302 may determine that economic growth is indicated. As another example, if a second pattern image corresponds to a situation that indicates a recession, and the image that corresponds to the newly received data sufficiently matches the second pattern image, then the time-series data image processing module 302 may determine that a recession is indicated.

In an exemplary embodiment, the historical market data may include pricing data for the list of S&P 500 companies. The list of S&P 500 companies includes common stocks that are issued by large-capitalization companies and are actively traded on American stock exchanges. The capitalization of these companies covers approximately 80% of the overall American equity market.

The historical market data may be obtained by querying the High, Low, Open, and Close (hereinafter "HLOC") dollar values for each of the S&P 500 companies for a particular time frame, such as, for example, Jan. 1, 2010 to Dec. 31, 2018. The obtained time-series data may be discretized to the daily HLOC values, and may be depicted by using a box-and-whisker diagram (also referred to herein as a candlestick diagram), in which box edges mark the Open and Close prices and the whiskers mark the Low and High daily values. In an exemplary embodiment, when the box is filled in with a gray color, the daily Open price was higher than the Close price for that day, and when the box is filled in with a white color, the daily Open price was lower than the Close price for that day.

In an exemplary embodiment, three "buy" indicators and three "sell" indicators may be determined based on an algorithm that depends solely on the Close values. A first buy indicator is referred to herein as "BB crossing," for which Bollinger Bands (BB) of a given time-series includes two symmetric bands of 20-day data moving two standard deviations. The bands envelop the inherent stock volatility while filtering the noise in the price data. Traders may use the price channels as bounds for the trading activity around the price trend. Hence, when prices continually touch the lower band or go below that band, the prices may be deemed to be in an oversold position, thereby triggering a buying opportunity. Therefore, the BB buy signal may be defined to trigger when the daily Close value crosses above the lower band. In a similar manner, the BB crossing technique may be used to identify a sell indicator.

A second buy indicator is referred to herein as "MACD crossing," for which a Moving Average Convergence Divergence (MACD) is a trend-following momentum indicator that compares the relationship between short and long exponential moving averages (EMA) of an asset. In an exemplary embodiment, the MACD may be computed by subtracting the 26-days EMA from the 12-days EMA. When the MACD falls to negative values, negative momentum is suggested; and conversely, when the MACD rises to positive values, upward momentum is indicated. A trader may prefer to wait for consistency in these measures, thus further smoothing the MACD line and computing the 9-days EMA of the MACD, which is also referred to as the "signal line". In an exemplary embodiment, the MACD buy signal may be defined to trigger when the signal line crosses above. In a similar manner, the MACD crossing technique may be used to identify a sell indicator.

A third buy indicator is referred to herein as "RSI crossing," for which a Relative Strength Index (RSI) is an oscillating indicator that summarizes the magnitude of recent price changes to evaluate overbought or oversold conditions of an asset. In an exemplary embodiment, the RSI may be computed as the ratio 14-day EMA of the incremental increase to the incremental decrease in asset values. The ratio may then be scaled to values that vary between zero (0) and one hundred (100); it rises as the number and size of daily gains increase, and it falls as the number and size of daily losses increase. A trader may use the RSI as an indication for an overbought state which might trigger a sell order or an oversold state which might trigger a buy order. In an exemplary embodiment, a threshold RSI value for indicating an oversold state is 30, and a threshold RSI value for indicating an overbought state is Accordingly, in an exemplary embodiment, the RSI buy signal may be defined to trigger when the RSI line crosses above the value of RSI=30. In a similar manner, the RSI crossing technique may be used to identify a sell indicator.

In an exemplary embodiment, there are at least two different ways to detect a time-dependent signal in a static image. A first way is to label the image in a manner that indicates the time aspect. A second way is to augment the images with sequential features. In an exemplary embodiment, a box-and-whisker diagram may be labeled using an algorithm that relates to any of the BB crossing indicator, the MACD crossing indicator, and the RSI crossing indicator, where each computes a time-dependent function. Thus, by using a corresponding label, each image encapsulates the notion of time. In this regard, the signal to be detected is always located on the right-hand side of the image, as the cross-above trigger always occurs on the last day.

Figure 5:
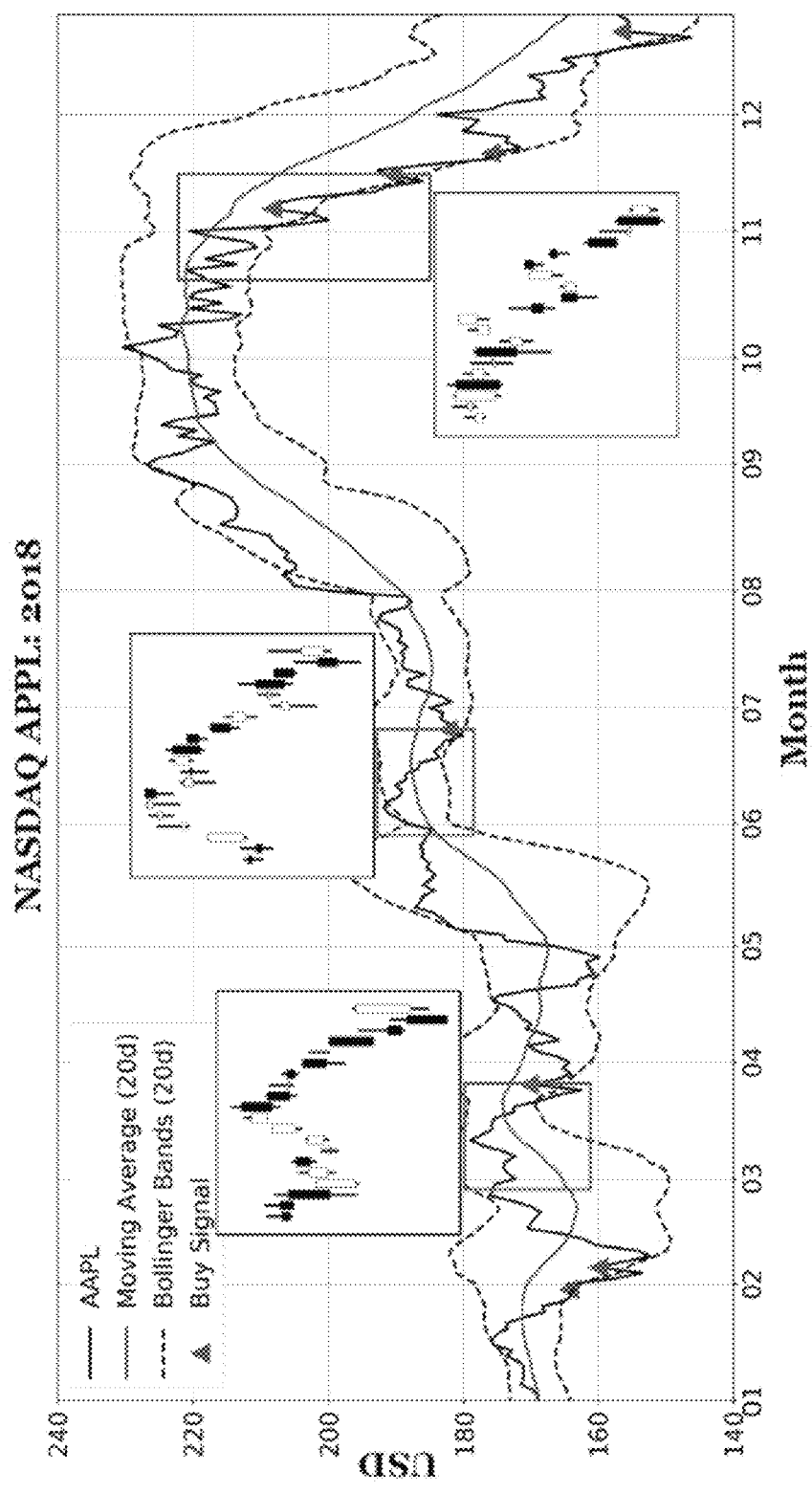
FIG. 5 is an exemplary set of time-series data within which sequences of data correspond to patterns to be used for matching with image data, according to an exemplary embodiment.

Referring to FIG. 5, three positively-labeled images that correspond to the BB crossing algorithm are shown. In an exemplary embodiment, these images may be generated by enveloping a 20-day interval of stock activity before and including the buy-signal day activity. In an exemplary embodiment, negatively-labeled images may be created from the same time series data by enveloping activity for days with no buy signal.

Referring to FIGS. 6A, 6B, 6C, 6D, and 6E, incorporating time-dependency via image augmentation may be achieved in various ways. For example, referring to FIG. 6A, the box-and-whisker notations may correspond to the daily HLOC values; and referring to FIG. 6B, the Close valves may be displayed as a line plot. As another example, referring to FIG. 6C, the widths of the boxes in the box-and-whisker diagram may be linearly varied. As yet another example, referring to FIG. 6D, the previous Close values may be overlaid on each box-and-whisker notation. As still another example, referring to FIG. 6E, the widths of the boxes may vary according to the relative change of the trade volume within the corresponding time frame. As yet another example, the positively labeled images may be mirrored, together with their time-axes, and then the labels may be inverted. As still another example, the numerical time-series data may be transformed to a corresponding value-space, thereby producing recurrence plots by making time implicit.

In an exemplary embodiment, a standard time interval may be used for converting the time-series data into an image. For example, a 30-day trading window may be used for generating an image, regardless of which buy indicator algorithm is used.

In an exemplary embodiment, the time-series data image processing module 302 may be configured to use the historical data as training data, in order to obtain specific patterns that are deemed as useful for comparisons with subsequent data. In an exemplary embodiment, the historical data may be randomized and then divided into a set of training data and a set of testing data, which is used for validating the accuracy of the methodology. For example, the training data may include 80% of the historical data, and the remaining 20% of the data may be used for testing.

In accordance with another exemplary embodiment, upon being started, the time-series data image processing module 302 executes a process for using images that represent time series data to forecast future image containing future values. An exemplary process for using images that represent time series data to forecast future image containing future values is generally indicated at flowchart 700 in FIG. 7.

Figure 7:
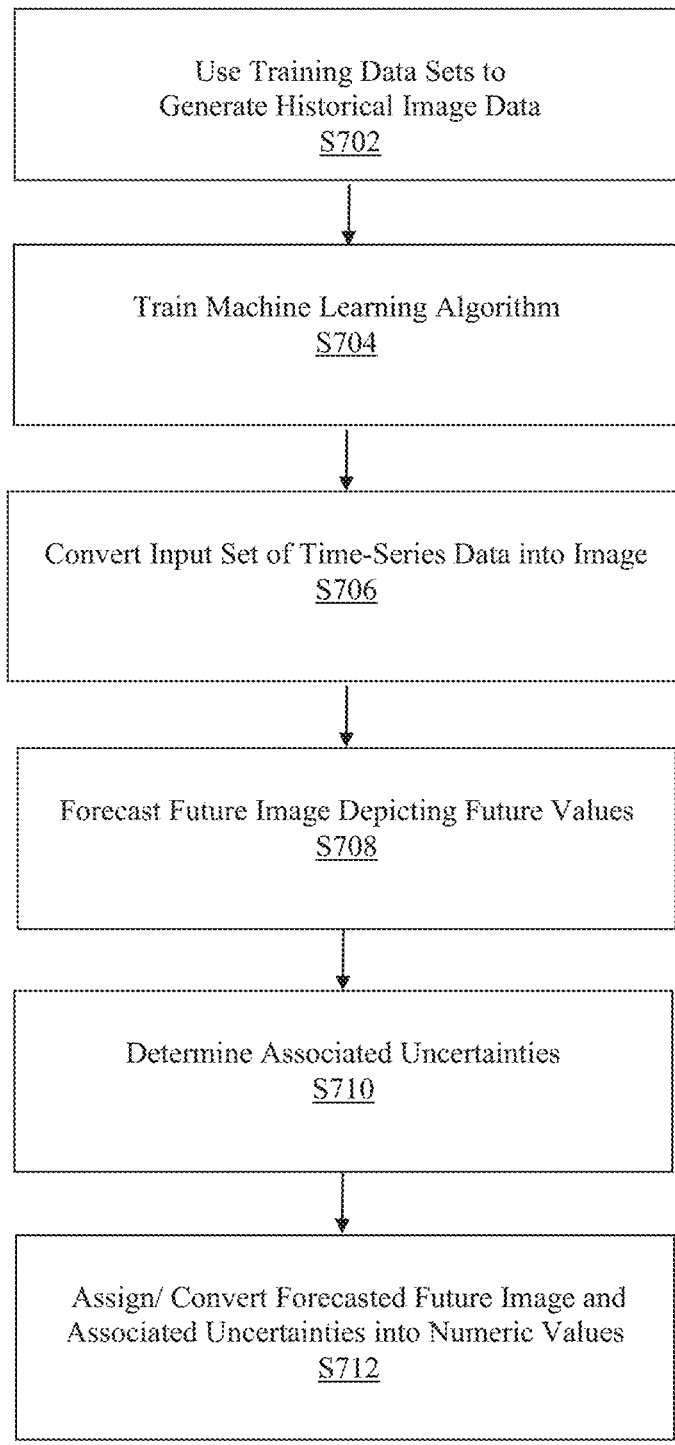
FIG. 7 is a flowchart of an exemplary process for implementing a method for using images that represent time-series data to forecast future images containing future values.

In the process 700 of FIG. 7, at step S702, the time-series data image processing module 302 uses training sets of time-series data to generate historical image data by converting each set of numeric data into an image, and then storing the images in a memory.

At step S704, the time-series data image processing module 302 uses the historical image data to train a machine learning algorithm. In an exemplary embodiment, the training of the machine learning algorithm may be performed as follows: First, an image that corresponds to one training set of time-series data is divided into two subsets that may have or may not have substantial overlap between them. For example, t0 may be a starting time for the first subset, t1 may be a starting time for the second subset, t2 may be an ending time for the first subset, and t3 may be an ending time for the second subset, where t0<t1<t2<t3, and as a result, the interval between t1 and t2 represents an overlap between the two subsets. Then, the first subset is provided as an input to the machine learning algorithm, which predicts the future values for the interval between t2 and t3 based on the data from the first subset. The predicted future values are then compared with the actual values from the second subset, in order to determine the accuracy of the predictions. Based on the results of the comparison, the machine learning algorithm may be adjusted (i.e., "trained"), and then the training process may be repeated on additional images that correspond to other training sets of time-series data.

In an exemplary embodiment, the machine learning algorithm may include an algorithm that relates to any one or more of Multinomial Regression models, Multioutput Classification models, Neural Network, Convolutional Neural Network, Autoencoders, Convolutional Autoencoders, Variational Autoencoders, and/or Generative Adversarial Networks At step S706, the time-series data image processing module 302 receives a new input set of time-series data and then converts the input data into an image. Then, at step S708, the newly converted image used to forecast at least one future image depicting values as pixelated information of a future time-series. In an exemplary embodiment, a desired future time interval is selected, and the forecasting is performed by providing the image and the predetermined future time interval to the machine learning algorithm as inputs. As a result, the machine learning algorithm outputs a set of predicted images depicting future values as pixelated information.

At step S710, a set of uncertainties is determined for each predicted pixelated future value. The uncertainty in pixelated future values can be diagnosed and quantified according to the depth, color, and/or density of the pixelated image that resides on the forecasted part of the image. In an exemplary embodiment, the machine learning algorithm uses the historical image data to compare the input image with previous images upon which the algorithm has been trained to determine a respective probability distribution for each forecasted future image. Each such probability distribution corresponds to an uncertainty for the forecasted pixelated future values in the future image, i.e. the pixelated jagged line between t2 and t3.

At step S712, the forecasted future image and the corresponding uncertainties are assigned numeric values with respect to the training data in S702.

Figure 8:
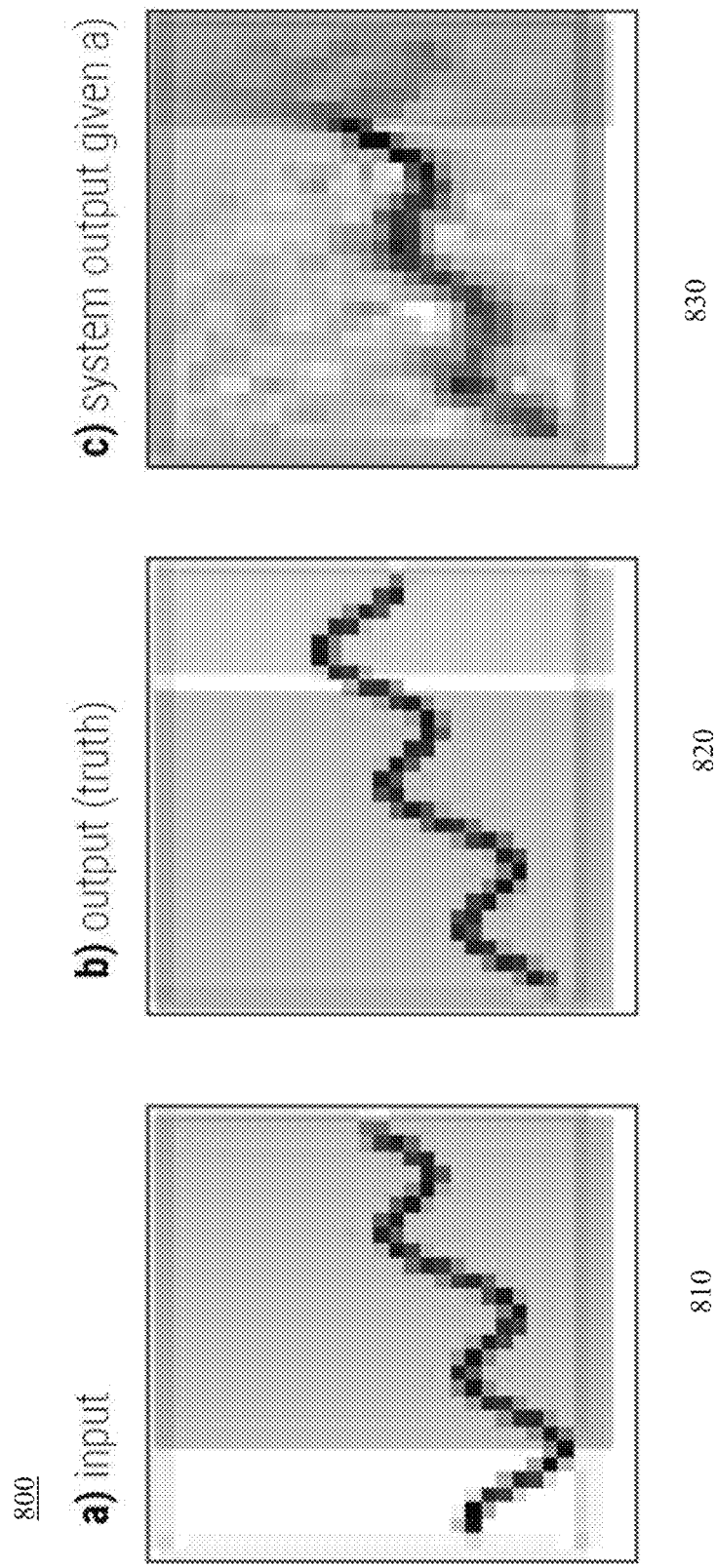
FIG. 8 is a first sequence of images that includes an input image, an output image, and a predicted output image that is generated by using the process of FIG. 7.

Referring to FIG. 8, a first sequence of images 800 that includes an input image 810, an output image 820, and a predicted output image 830 that is generated by using the process of FIG. 7 is illustrated. In the input image 810, the time-series data is depicted as an image that appears as a curve that has a roughly sinusoidal shape with an overall increase in value over time. In the output image 820, the shaded part of the input image 810 represents an overlapping portion of the time-series data, and is therefore reproduced on the left side of output image 820. The right side of output image 820 represents the actual future values that occurred in this set of time-series data. In the predicted output image 830, the input image 810 has been provided as an input to a machine learning algorithm that is included in the time-series data image processing module 302, and the output of the algorithm is a shown in the darkly shaded area on the right side of predicted output image 830. As illustrated, these predicted future values are associated with relatively high degrees of uncertainty, and as a result, there is a relatively large amount of pixelation, thereby causing the image to appear blurry.

Figure 9:
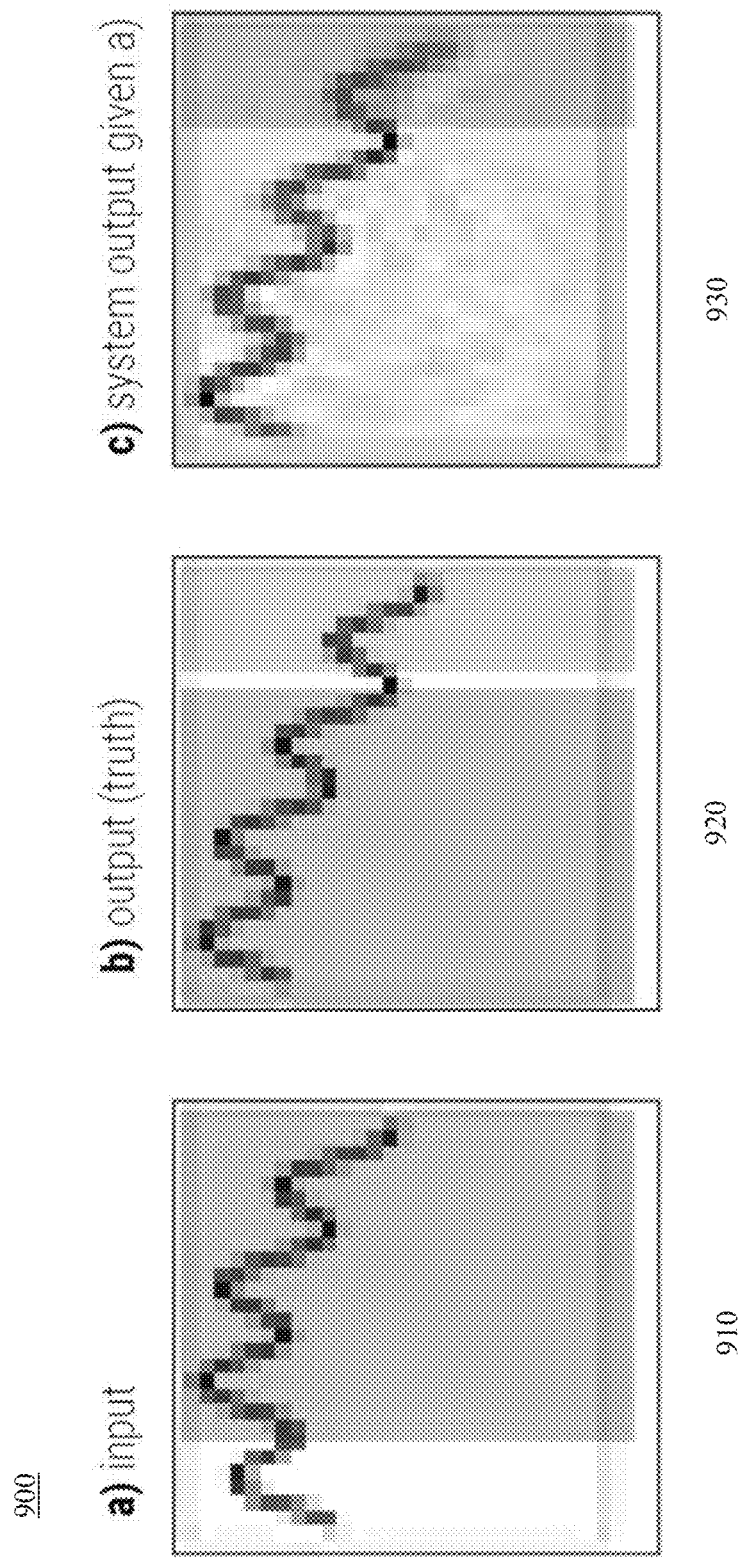
FIG. 9 is a second sequence of images that includes an input image, an output image, and a predicted output image that is generated by using the process of FIG. 7.

Referring to FIG. 9, a second sequence of images 900 that includes an input image 910, an output image 920, and a predicted output image 930 that is generated by using the process of FIG. 7 is illustrated. In the input image 910, the time-series data is depicted as an image that appears as a curve that has a roughly sinusoidal shape with a generally decreasing trend in value over time. In the output image 920, the shaded part of the input image 910 represents an overlapping portion of the time-series data, and is therefore reproduced on the left side of output image 920. The right side of output image 920 represents the actual future values that occurred in this set of time-series data. In the predicted output image 930, the input image 910 has been provided as an input to a machine learning algorithm that is included in the time-series data image processing module 302, and the output of the algorithm is a shown in the darkly shaded area on the right side of predicted output image 830. As illustrated, these predicted future values are associated with relatively low degrees of uncertainty, and as a result, there is a relatively small amount of pixelation, thereby causing the image to appear clear and sharp.

Accordingly, with this technology, an optimized process for implementing methods and systems for identifying signals or patterns in time series data by treating the series as an image and using such images to forecast future values is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and. servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or apes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for using images that represent time-series data to forecast corresponding images depictingfuture values as pixelated information, the method being implemented by at least one processor, the method comprising: receivinga plurality of training sets of time-series data; converting each respective one of the plurality of training sets of time-series data into a corresponding one of a plurality of training images; receivinga first set of time-series data; converting the received first set of time-series data into a first image;
using the plurality of training images in conjunction with the first image to forecast at least one image depicting at least one future value as pixelated information; and
determining, by comparing the first image with the plurality of training images, a probability distribution for each of the at least one image depicting the at least one future value as pixelated information.

2. The method of claim 1, wherein there is a direct correlation between the probability distribution and degree of pixelation for each of the at least one image depicting the at least one future value as pixelated information.

3. The method of claim 1 further comprising:
using the plurality of training images to generate a historical database;
using the historical database as an input to at least one machine learning algorithm from among a Multinomial Regression model, a Multioutput Classification model, a Neural Network, a Convolutional Neural Network, an Autoencoder, a Convolutional Autoencoder, a Variational Autoencoder, and a Generative Adversarial Network; and
using the at least one machine learning algorithm in conjunction with the first image to forecast the at least one image depicting the at least one future value as pixelated information.

4. The method of claim 3, wherein the at least one image depicting the at least one future value as pixelated information includes a plurality of future images depicting a plurality of future values that corresponds to a predetermined future time interval.

5. The method of claim 4, further comprising determining, for each respective one of the plurality of future images, a respective probability that indicates a corresponding uncertainty with respect to an accuracy of the respective one of the plurality of future images.

6. The method of claim 5, wherein the using of the first image to forecast the at least one image depicting the at least one future value as pixelated information comprises representing the corresponding uncertainty by using at least one from among a depth, a color, and a density of the pixelated information.

7. The method of claim 6, further comprising:
determining, for each training set of the plurality of training sets of time-series data, a first subset that begins at a first beginning time and ends at a first ending time, and a second subset that begins at a second beginning time and ends at a second ending time, such that the second beginning time occurs before or after the first ending time and the second ending time occurs after the second ending time;
for each training set, using the first subset as an input to the at least one machine learning algorithm;
for each training set, using the at least one machine learning algorithm to predict values that correspond to the second subset;
comparing the predicted values with the second subset; and
adjusting the at least one machine learning algorithm based on a result of the comparing.

8. The method of claim 7, wherein the determining of each respective probability that indicates the corresponding uncertainty is performed based on a result of the comparing the predicted values with the second subset.

9. The method of claim 8, further comprising using the at least one adjusted machine learning algorithm to re-forecast each of the plurality of future images depicting the plurality of future values as pixelated information that corresponds to the predetermined future time interval.

10. A computing apparatus for using images that represent time- series data to forecast corresponding images depicting future values as pixelated information, the computing apparatus comprising:
a processor;
a memory; and
a communication interface coupled to each of the processor and the memory, wherein the processor is configured to:
receive a plurality of training sets of time-series data;
convert each respective one of the plurality of training sets of time-series data into a corresponding one of a plurality of training images;
receive a first set of time-series data;
convert the received first set of time-series data into a first image; and
use the plurality of training images in conjunction with the first image to forecast at least one image depicting at least one future value as pixelated information; and
determining, by comparing the first image with the plurality of training images, a probability distribution for each of the at least one image depicting the at least one future value as pixelated information.

11. The computing apparatus of claim 10, wherein there is a direct correlation between the probability distribution and degree of pixelation for each of the at least one image depicting the at least one future value as pixelated information.

12. The computing apparatus of claim 10, wherein the processor is further configured to:
use the plurality of training images to generate a historical database;
use the historical database as an input to at least one machine learning algorithm from among a Multinomial Regression model, a Multioutput Classification model, a Neural Network, a Convolutional Neural Network, an Autoencoder, a Convolutional Autoencoder, a Variational Autoencoder, and a Generative Adversarial Network; and
use the at least one machine learning algorithm in conjunction with the first image to forecast the at least one image depicting the at least one future value as pixelated information.

13. The computing apparatus of claim 12, wherein the at least one image depicting the at least one future value as pixelated information includes a plurality of future images depicting a plurality of future values that corresponds to a predetermined future time interval.

14. The computing apparatus of claim 13, wherein the processor is further configured to determine, for each respective one of the plurality of future images, a respective probability that indicates a corresponding uncertainty with respect to an accuracy of the respective one of the plurality of future images.

15. The computing apparatus of claim 14, wherein for each respective one of the plurality of future images, the processor is further configured to represent the corresponding uncertainty by using at least one from among a depth, a color, and a density of the pixelated information.

16. The computing apparatus of claim 15, wherein the processor is further configured to:
determine, for each training set of the plurality of training sets of time-series data, a first subset that begins at a first beginning time and ends at a first ending time, and a second subset that begins at a second beginning time and ends at a second ending time, such that the second beginning time occurs before or after the first ending time and the second ending time occurs after the second ending time;
for each training set, use the first subset as an input to the at least one machine learning algorithm;
for each training set, use the at least one machine learning algorithm to predict values that correspond to the second subset;
compare the predicted values with the second subset; and
adjust the at least one machine learning algorithm based on a result of the comparison.

17. The computing apparatus of claim 16, wherein the processor is further configured to determine each respective probability that indicates the corresponding uncertainty based on a result of the comparison of the predicted values with the second subset.

18. The computing apparatus of claim 17, wherein the processor is further configured to use the at least one adjusted machine learning algorithm to re-forecast each of the plurality of future images depicting the plurality of future values that corresponds to the predetermined future time interval.

* * * * *